(12) United States Patent
Kitagawa

(10) Patent No.: US 6,708,231 B1
(45) Date of Patent: Mar. 16, 2004

(54) METHOD AND SYSTEM FOR PERFORMING A PERIPHERAL FIRMWARE UPDATE

(75) Inventor: Masayuki Kitagawa, Irvine, CA (US)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/372,485

(22) Filed: Aug. 12, 1999

(51) Int. Cl.[7] ............................................... G06F 11/36
(52) U.S. Cl. .................... 710/10; 713/1; 714/3
(58) Field of Search .................. 710/8–10, 49, 710/104; 713/1–2, 100; 714/1–3, 11, 41

(56) References Cited

U.S. PATENT DOCUMENTS

| | | | | |
|---|---|---|---|---|
| 4,634,110 A | * | 1/1987 | Julich et al. .................. 714/11 |
| 5,467,286 A | * | 11/1995 | Pyle et al. .................... 702/62 |
| 6,078,541 A | * | 6/2000 | Kitagawa et al. ...... 365/230.01 |
| 6,101,600 A | * | 8/2000 | Arnold et al. ................. 713/1 |
| 6,148,397 A | * | 11/2000 | Chang ........................... 713/1 |
| 6,237,091 B1 | * | 5/2001 | Firooz et al. .................. 713/1 |
| 6,357,021 B1 | * | 3/2002 | Kitagawa et al. ............. 714/41 |
| 6,401,197 B1 | * | 6/2002 | Kondo .......................... 713/1 |

* cited by examiner

Primary Examiner—Christopher B. Shin
(74) Attorney, Agent, or Firm—Knobbe Martens Olson & Bear LLP

(57) ABSTRACT

The present invention provides systems and methods for performing a firmware update. In one embodiment, a peripheral reset signal is masked in response to a peripheral firmware update command. The firmware update is loaded into a peripheral's nonvolatile memory while the reset signal is masked.

32 Claims, 2 Drawing Sheets

METHOD AND SYSTEM FOR PERFORMING A PERIPHERAL FIRMWARE UPDATE

BACKGROUND OF THE INVENTION

1. Field of the Invention

The present invention relates to peripheral devices. Specifically, the present invention relates to a method and apparatus for updating firmware of a peripheral device.

2. Description of the Related Art

A peripheral device is a device that is coupled to a computer to perform a given function. Peripheral devices are often located external to the computer housing. Peripheral devices may include, for example, optical drives, magnetic disc drives, hard drives, DVD drives, internal and external modems, Personal Digital Assistants (PDAs), solid state memories, network interfaces, video cameras, digital cameras, printers, scanners, fax machines, and the like.

In many peripheral devices, firmware is the executable code and associated data that control the operation of a peripheral device. Conventionally, firmware is stored in a nonvolatile memory of the peripheral device. Some peripheral devices allow the host computer to transmit firmware updates to the peripheral device via a peripheral device bus. Firmware updates may be made available, for example, to eliminate bugs or to add new functions to the peripheral device.

The transmission of a firmware update may become interrupted if the peripheral device receives a reset signal during the transmission. A number of different circumstances may cause the peripheral device to receive a reset signal during the transmission of a firmware update. For example, the host computer may send a reset signal to the peripheral device if the user resets the host computer or if the host computer temporarily loses power. In addition, if the peripheral device bus becomes disconnected from the peripheral device, the peripheral device bus may send a reset signal to the peripheral device when the peripheral device bus is reconnected.

If a peripheral device receives a reset signal during the transmission of a firmware update, then the peripheral device may store an incomplete portion of the update in the peripheral device's nonvolatile memory. Storage of an incomplete portion of a firmware update may cause the data stored in the nonvolatile memory of the peripheral device to become corrupted, which may cause the peripheral device to malfunction.

SUMMARY OF THE INVENTION

The present invention advantageously provides systems and methods for ensuring that firmware updates are performed reliably. In one embodiment of the present invention, a signal which could interfere with a firmware download or update process of a peripheral device is blocked during the firmware update process. Thus, by way of example, a reset signal is masked in response to a firmware update command.

In one embodiment, the peripheral device includes a processor, such as a microprocessor or a microcontroller, a volatile memory, and a nonvolatile memory. The microcontroller is used to transfer the firmware update from the volatile memory to the nonvolatile memory. Conventionally, if the microcontroller is reset during the transfer, the transfer is corrupted. Using one embodiment of the present invention, the reset signal to the microcontroller is masked during the firmware update, thereby ensuring the transfer is not interrupted.

In one embodiment of the invention, a method of storing a firmware update in a nonvolatile memory of a peripheral device includes the acts of receiving a firmware update command, receiving the firmware update data from a host computer, and storing the firmware update in a volatile memory of the peripheral device. In addition, the accuracy of the firmware update stored in the volatile memory is verified. A reset signal going to a firmware update circuit is masked. In addition, a timer is started. The firmware update is stored in the nonvolatile memory while the reset signal is masked. Once the timer reaches a first count, an indication that the firmware update is stored in the nonvolatile memory is provided. The reset signal is unmasked.

In another embodiment, a method of storing a firmware update in a nonvolatile memory of a peripheral device includes masking a reset signal in response to a firmware update command and storing the firmware update in the nonvolatile memory while the reset signal is masked.

In still another embodiment, a peripheral device couplable to a host computer includes firmware update circuitry, a firmware update detector configured to detect a firmware update command, and a reset signal masker configured to prevent the firmware update circuitry from receiving the reset signal during a firmware update process.

In yet another embodiment, a peripheral device, couplable to a host computer, includes firmware update circuitry, a firmware update detector configured to detect a firmware update command, and a means for blocking a reset signal from reaching the firmware update circuitry during a firmware update process.

In one embodiment, a method of downloading firmware to a peripheral device includes the acts of receiving a firmware transfer indication, preventing a reset signal from resetting at least a portion of the peripheral device in response to at least the firmware transfer indication, and allowing the reset signal to reset at least the portion of the peripheral device after the firmware transfer is complete.

In another embodiment, a computer system includes a host computer configured to provide a firmware update, a bus, configured to transfer a firmware update, couplable to the host computer, and a peripheral device couplable to the bus. The peripheral device includes firmware update circuitry, a firmware update detector configured to detect a firmware update command, and a reset signal masker configured to prevent the firmware update circuitry from receiving a signal during a firmware update process.

For purposes of summarizing the invention, certain aspects advantages and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

DETAILED DESCRIPTION OF A PREFERRED EMBODIMENT

One embodiment of the present invention is described herein, which is intended to illustrate, and not limit, the scope of the invention.

The present invention advantageously provides systems and methods for ensuring that firmware updates or downloads are performed reliably. In one embodiment of the present invention, a signal which could interfere with a firmware download or update process is blocked during the firmware update process.

Figure 1:
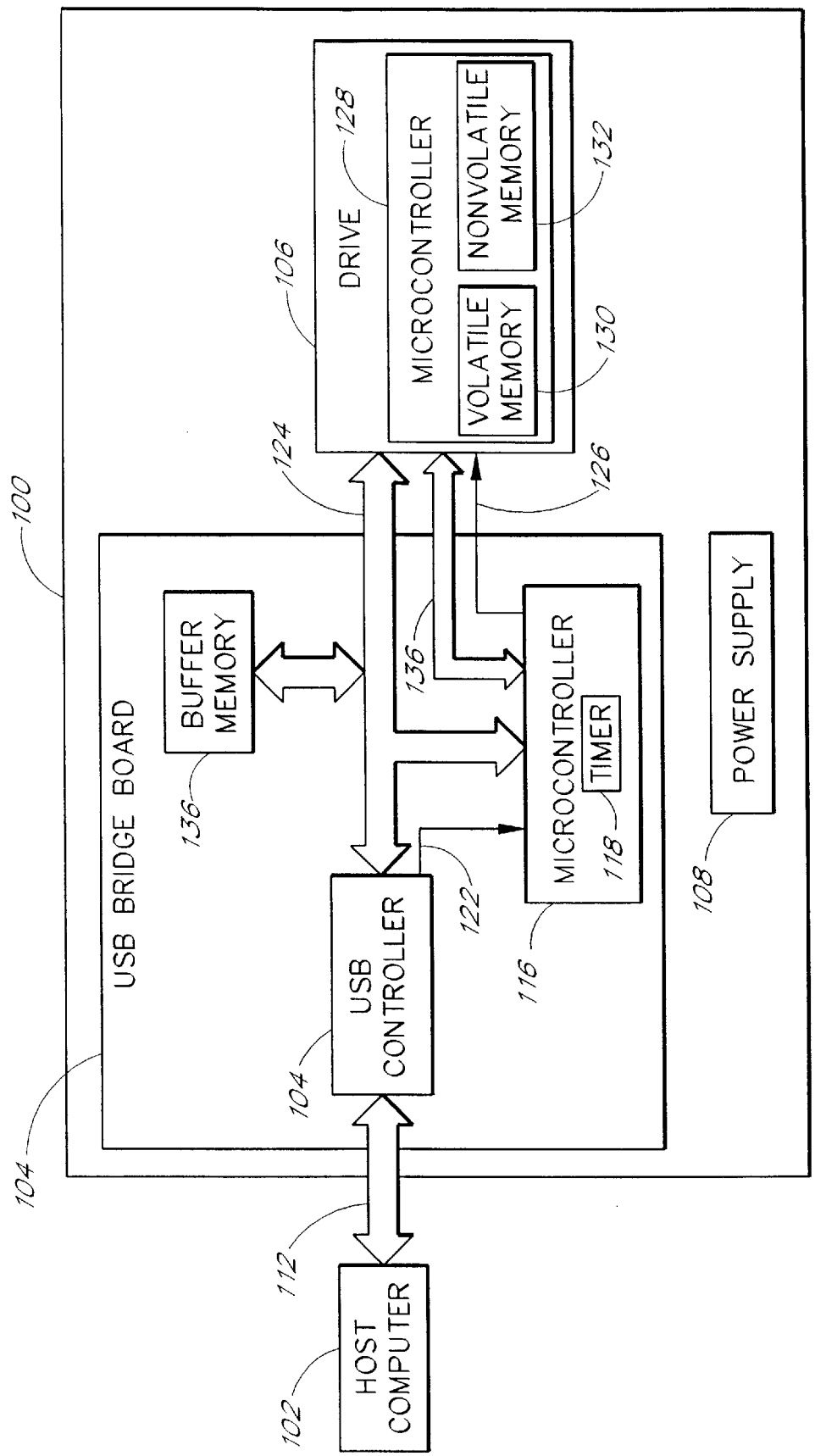
FIG. 1 illustrates one configuration of a device in accordance with one embodiment of the present invention.

FIG. 1 illustrates one embodiment of a peripheral device 100 suitable for use with one embodiment of the present invention. In one embodiment, the peripheral device 100 may have its own housing and may be configured to be located outside a host computer housing (not shown). Alternatively, in another embodiment, the peripheral device 100 can be configured to be mounted within a host computer housing.

As illustrated in FIG. 1, the peripheral device 100 is coupled to a host computer 102 via a peripheral device bus 110. The host computer 102 may be, for example, a personal computer. The peripheral device bus 110 is used to provide a reset signal from the host-side to the peripheral 100. The reset signal may be provided as a discrete signal line 112. In addition, a reset signal may be provided over the peripheral device bus 110 as a command, such as, by way of example, a USB Command Block Reset command. The peripheral device bus 110 may use any suitable bus architecture or interface, such as a USB, an IEEE 1394 interface, an Integrated Drive Electronics (IDE)/ATAPI interface or a Small Computer Standard Interface (SCSI). In addition, the peripheral device 100 may be configured to communicate with the host computer 102 via an infrared or other wireless interface. In one embodiment, the peripheral device 100 complies with the USB specification, Revision 1.1 and with the USB mass storage class definition.

In the illustrated embodiment, the peripheral device 100 includes a USB bridge board 104, a drive 106, and a power supply 108. In one embodiment, the USB board interfaces the peripheral bus 110 to the drive 106. In another embodiment, the drive 106 is connected directly to the bus 110.

The exemplary USB bridge board 104 includes a USB controller 114, a board microcontroller 116, a timer 118, and a buffer memory 134. In one embodiment, the timer 118 is located within the board microcontroller 116. Alternatively, in other embodiments, the timer 118 may be located outside the board microcontroller 116.

The USB controller 114 is coupled to the host computer 102 via the peripheral device bus 110 and to the board microcontroller 116 via a microcontroller bus 124. The microcontroller bus 124 is also coupled to the drive 106. A second reset signal line 122 is provided by the USB controller 114 to the microcontroller 116.

In addition, the board microcontroller 116 is coupled to the drive 106 via a drive control bus 136. The drive control bus 136 includes a third reset signal line 126. The drive control bus 136 may use any suitable bus architecture or interface, such as an Integrated Drive Electronics (IDE)/ATAPI interface.

In general, the USB controller 114 handles the interface to the peripheral device bus 110, while the board microcontroller 116 manages the operation of the USB bridge board 104 itself. In one embodiment, the power supply 108 provides power for the peripheral device 100. Alternatively, in other embodiments, the power for the peripheral device 100 may be provided by the peripheral device bus 110.

The drive 106 includes a drive microcontroller 128, a volatile memory 130, and a nonvolatile memory 132. The volatile memory 130 may include, by way of example, random access memory, such as DRAM, SRAM, or the like. The nonvolatile memory 132 may use a variety of reprogrammable technologies, for example, flash memory, EEPROM, battery-backed memory, or the like. In the embodiment illustrated in FIG. 1, the volatile memory 130 and the nonvolatile memory 132 are located within the drive microcontroller 128. However, in other embodiments, the volatile memory 130 and the nonvolatile memory 132 may be located outside the drive microcontroller 128 and coupled to the drive microcontroller 128 via a suitable bus. The nonvolatile memory 132 contains firmware, which controls the operation of the drive 106.

The drive 106 may be or include, for example, a compact disc read/write drive (CD-R/W drive), a hard drive, a DVD drive, a magnetic disk drive, or a solid state memory. In other embodiments, rather than a drive 106, the firmware update recipient may be an internal or external modem, a Personal Digital Assistant (PDA), a scanner, a printer, a network interface, a fax machine, a video camera, a digital camera, or the like.

If the drive 106 is a CD-R/W drive, the drive 106 may be configured to accept rewritable CD (CD-RW) discs, write-once CD (CD-R) discs, CD-ROM discs, and musical CDs. Alternatively, if the drive 106 is a DVD drive, the drive 106 may be capable of accepting the various CD disc-types, rewritable DVD discs, write-once DVD discs, and read-only DVD discs. In the embodiment illustrated in FIG. 1, the drive 106 is a standard Advanced Technology Attachment Packet Interface (ATAPI) CD-R/W drive.

In one embodiment, the peripheral device bus 110 is a USB bus, and the drive bus 136 is an ATAPI control bus. The USB bridge board 104 provides an interface between the USB bus 110 and the ATAPI bus. In operation, the USB controller 114 receives USB packet commands from the host computer 102 via the peripheral device bus 110. The USB controller 114 translates the USB packet commands into ATAPI packet commands and transfers them to the board microcontroller 116 via the microcontroller bus 124. The board microcontroller 116 processes the ATAPI packet commands and transfers them to the drive microcontroller 128 via the buses 124, 136. The drive microcontroller 128 processes the ATAPI packet commands and performs the appropriate function.

During normal operation, if the host computer 102 issues a reset signal, the signal is transmitted to the USB controller 114 via the reset signal line 112 of the peripheral device bus 110, or as a command over the bus 110. The USB controller 114 then provides the reset signal to the board microcontroller 116 via the reset signal line 122. In one embodiment, the reset signal line 122 is connected to a board microcontroller interrupt input. The board microcontroller 116 then processes or services the reset signal and, in response, provides a reset signal to the drive microcontroller 128 via the reset signal line 126 of the drive bus 136.

Figure 2:
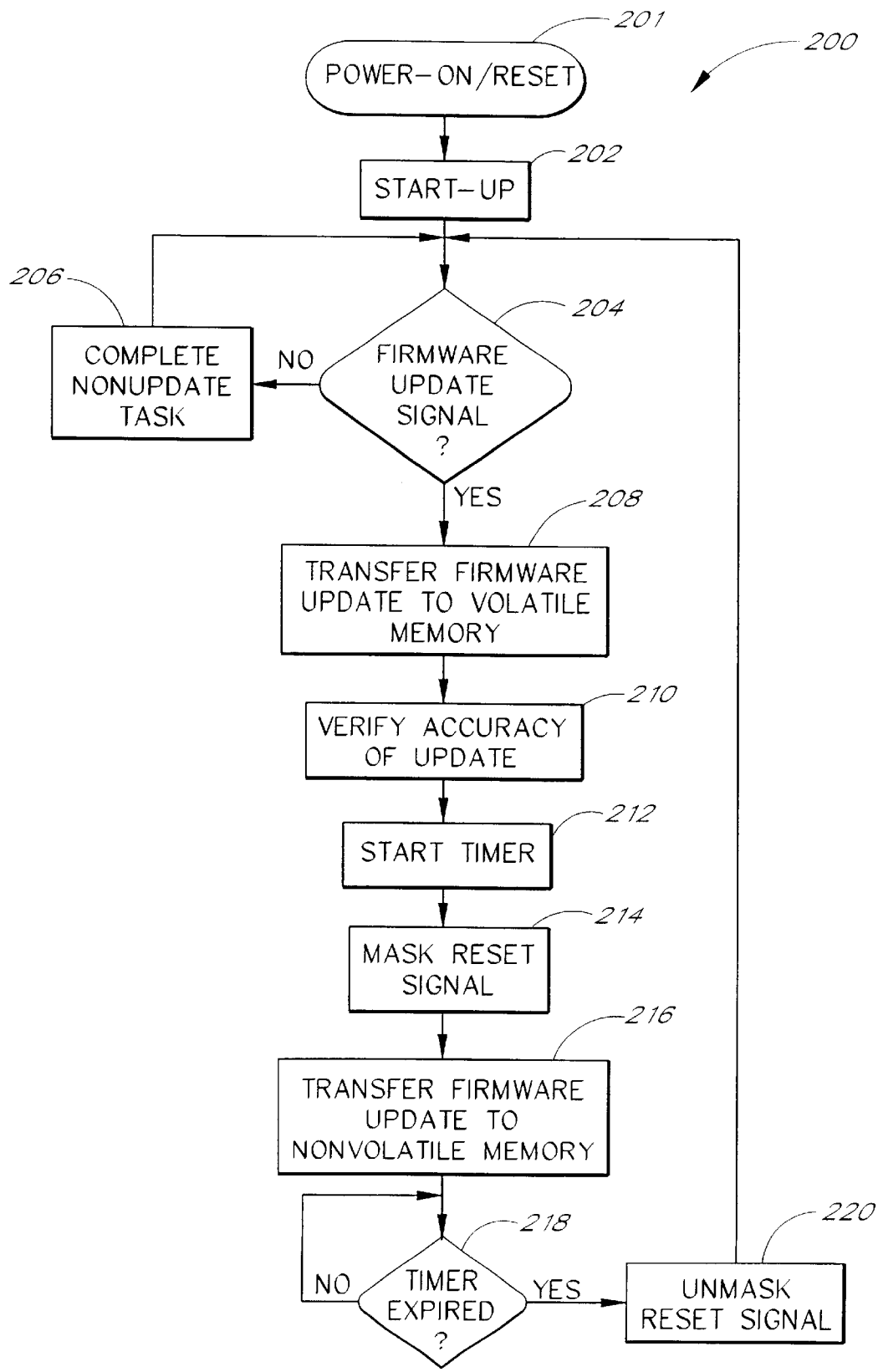
FIG. 2 illustrates a flow diagram of a firmware update method according to one embodiment of the present invention.

The host computer 102 may periodically transmit firmware updates to the peripheral device 100. That is, the new or updated firmware may be downloaded to the peripheral 100. In one embodiment, the updated software overwrites existing firmware stored in nonvolatile memory 132. In another embodiment, the new or updated firmware does not overwrite existing firmware. FIG. 2 illustrates an exemplary operation of the board microcontroller 116 during a firmware update method 200 according to one embodiment of the present invention.

During step 201, the board microcontroller 116 receives a power-on or a reset signal via the reset signal line 112 of the peripheral device bus 110. During step 202, the board microcontroller 116 executes various start-up tasks, such as initializing hardware or variables. During step 204, the board microcontroller 116 waits for the host computer 102 to issue a firmware update command. If the host computer 102 issues a command other than a firmware update command, the board microcontroller 116 completes the non-update command during step 206 and returns to step 204 to continue waiting for a firmware update command.

Once the host computer 102 issues a firmware update command, the board microcontroller 116 transfers the firmware update from the host computer 102 to the volatile memory 130 of the drive 106 during step 208. During step 210, the board microcontroller 116 verifies the accuracy of the firmware update stored in the volatile memory 130 using any suitable error-checking procedure, such as a cyclic redundancy check (CRC). During step 212, the board microcontroller 116 starts the timer 118 for a predetermined time period, the time period exceeding the time needed to transfer the firmware update from the volatile memory 130 to the nonvolatile memory 132. During step 214, the board microcontroller 116 inhibits the generation of the reset signal line 126 of the drive bus 124. The drive microcontroller 128 is thereby prevented from being reset until the reset signal line 126 is unmasked or enabled. In one embodiment, the inhibit function is accomplished by masking the interrupt input connected to the reset signal 114, thereby preventing the microcontroller 116 from generating a reset over the line 126.

During step 216, the board microcontroller 116 transfers the firmware update from the volatile memory 130 to the nonvolatile memory 132 of the drive 106. During step 218, the board microcontroller 116 then waits for the timer 118 to at least reach a first count or to expire. Once the timer 118 reaches the first count or expires, the board microcontroller 116 unmasks the reset signal line 126 of the drive bus 124 during step 220. The board microcontroller 116 then returns to step 204 to wait for another firmware update command.

Advantageously, the firmware update method 200 prevents the drive microcontroller 128 from receiving a reset signal during the transfer of a firmware update from the volatile memory 130 to the nonvolatile memory 132. If the drive microcontroller 128 receives a reset signal during the transfer of a firmware update, then the drive microcontroller 128 may store an incomplete portion of the update in the nonvolatile memory 132. Storage of an incomplete portion of a firmware update may disadvantageously cause the data stored in the nonvolatile memory 132 to become corrupted, which may cause the peripheral device 100 to malfunction. Because the firmware update method 200 reduces the likelihood that an incomplete portion of the firmware update will be stored in the nonvolatile memory 132, the firmware update method 200 improves the performance, reliability, and safe operation of the peripheral device 100.

In the embodiment discussed above, the timer 118 is used to determine when the firmware update procedure has concluded. However, other embodiments, other techniques may be used to determine when the firmware update is complete. In one embodiment, a non-volatile memory program signal (not shown) is monitored. The program signal is enabled by the drive microcontroller 128 during the download procedure. Once the firmware download is complete, the program signal is deasserted. Upon detecting the deassertion of the program signal, one embodiment of the present invention ceases masking the interrupt signal. In another embodiment, once the download procedure is complete, the microcontroller 128 interrupts the microcontroller 116, indicating that the microcontroller should stop masking the reset signal.

While embodiments and applications of this invention have been shown and described, it will be apparent to those skilled in the art that various modifications are possible without departing from the scope of the invention. It is, therefore, to be understood that within the scope of the appended claims, this invention may be practiced otherwise than as specifically described.

What is claimed is:

1. A method of storing a firmware download in a nonvolatile memory of a peripheral device, the method comprising:

receiving a firmware download command;

receiving the firmware download from a host computer;

storing the firmware download in a volatile memory of the peripheral device;

verifying the accuracy of the firmware download stored in the volatile memory;

masking a reset signal;

transferring the firmware download from the volatile memory to the nonvolatile memory while the reset signal is masked;

providing an indication that the firmware download transfer to the nonvolatile memory is complete; and unmasking the reset signal after the indication that the firmware download is complete is provided.

2. A method of storing a firmware update in a nonvolatile memory of a peripheral device, the method comprising:

preventing a reset signal from resetting at least a portion of the peripheral device in response to a firmware update command; and storing the firmware update in the nonvolatile memory while the reset signal is masked.

3. The method of claim 2, further comprising allowing the reset signal to reset at least a portion of the peripheral once the firmware update is completed.

4. The method of claim 2, further comprising:

receiving the firmware update from a host computer; and storing the firmware update in a volatile memory of the peripheral device.

5. The method of claim 4, further comprising transferring the firmware update from a USB interface to the nonvolatile memory.

6. The method of claim 4, further comprising verifying the accuracy of the firmware update stored in the volatile memory.

7. The method of claim 2, further comprising starting a timer to determine, at least in part, the length of time during which the reset signal is prevented from resetting at least a portion of the peripheral.

8. The method of claim 2, wherein the preventing act further comprises masking the reset signal.

9. The method of claim 2, wherein the volatile memory is a random access memory.

10. The method of claim 2, wherein the nonvolatile memory comprises a flash memory.

11. A peripheral device couplable to a host computer, the peripheral device comprising:

a firmware download circuit;

a firmware download detector configured to detect a firmware download command; and a reset signal inhibit circuit configured to at least temporarily prevent the firmware download circuitry from receiving a reset signal if a firmware download command is detected by the firmware download detector.

12. The peripheral device of claim 11, wherein the firmware download circuit includes a processor.

13. The peripheral device of claim 11, wherein the reset signal inhibit signal includes a processor.

14. The peripheral device of claim 11, further comprising a nonvolatile memory used to contain firmware.

15. The peripheral device of claim 11, further comprising a USB interface used to receive the firmware update command from the host computer.

16. The peripheral device of claim 11, further comprising an optical drive having both semiconductor volatile and nonvolatile memory.

17. The peripheral device of claim 16, wherein the volatile memory and nonvolatile memory are located within a processor.

18. The peripheral device of claim 16, wherein the optical drive has an ATAPI interface.

19. The peripheral device of claim 16, wherein the optical drive includes a CD R/W drive.

20. The peripheral device of claim 16, wherein the optical drive includes a DVD drive.

21. The peripheral device of claim 16, configure to receive the reset signal as a discrete signal from the host computer.

22. The peripheral device of claim 16, configure to receive the reset signal as a USB reset command from the host computer.

23. A peripheral device couplable to a host computer, the peripheral device comprising:

a firmware download circuit;

a firmware download detector configured to detect a firmware download command; and means for blocking a reset signal from reaching the firmware download circuit during a firmware download process.

24. The peripheral device of claim 23, further comprising a programmable nonvolatile memory used to contain firmware received at least from the host computer.

25. The peripheral device of claim 23, further comprising an optical drive.

26. The peripheral device of claim 23, further comprising a USB interface used to receive the reset signal from the host computer.

27. A method of downloading firmware to a peripheral device, comprising:

receiving a firmware transfer indication;

preventing a reset signal from resetting at least a portion of the peripheral device in response to at least the firmware transfer indication; and allowing the reset signal to reset at least the portion of the peripheral device after the firmware transfer is complete.

28. The method of downloading firmware as defined in claim 27, wherein the firmware transfer indication is a firmware download command.

29. The method of downloading firmware as defined in claim 27, further comprising:

starting a timer; and providing an indication that the firmware transfer is complete when the timer reaches a first count.

30. A computer system comprising:

a host computer configured to provide a firmware download;

a bus couplable to the host computer, the bus configured to transfer a firmware download to a peripheral device; and the peripheral device couplable to the bus comprising:

firmware download circuitry;

a firmware download detector configured to detect a firmware download command; and a reset signal inhibit circuit configured to prevent the firmware download circuitry from receiving a reset signal during a firmware download process.

31. The computer system of claim 30, wherein the bus is a USB compatible bus.

32. The computer system of claim 30, wherein the peripheral device further comprises an optical drive.

* * * * *